Feb. 21, 1933.    R. O. VANDERCOOK ET AL    1,898,605
PROOF PRESS AND INKING MECHANISM THEREFOR
Original Filed Oct. 10, 1927    7 Sheets-Sheet 1

Feb. 21, 1933. R. O. VANDERCOOK ET AL 1,898,605
PROOF PRESS AND INKING MECHANISM THEREFOR
Original Filed Oct. 10, 1927 7 Sheets-Sheet 3

Inventors:
Robert O. Vandercook
Edward O. Vandercook
Frederick R. Vandercook
David N. Vandercook
By A. Miller Belfield
Atty.

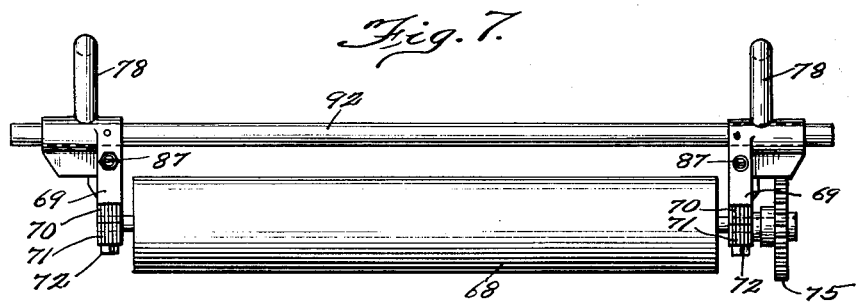
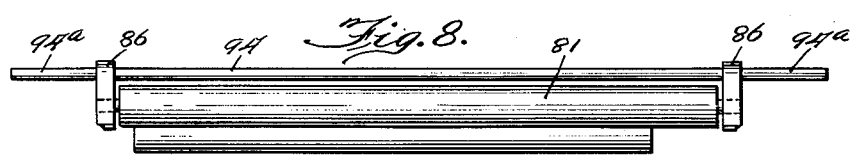
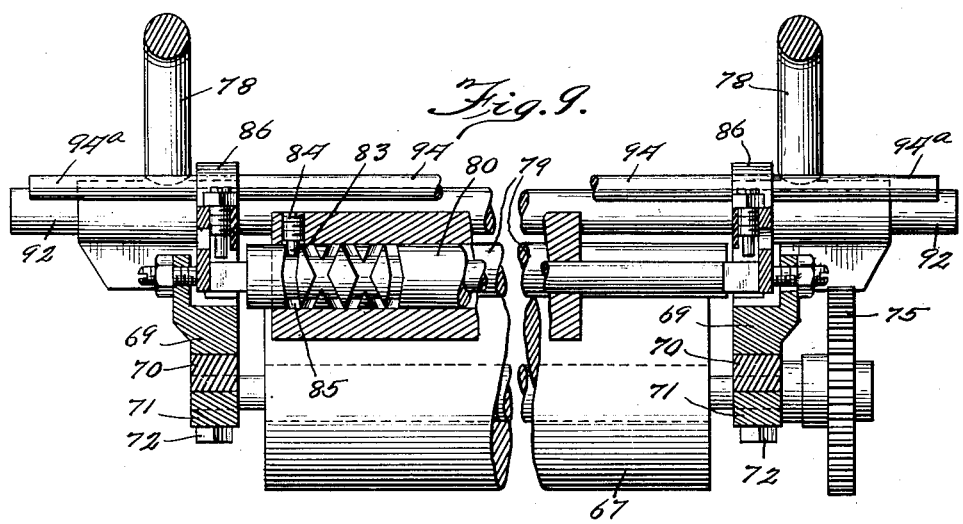
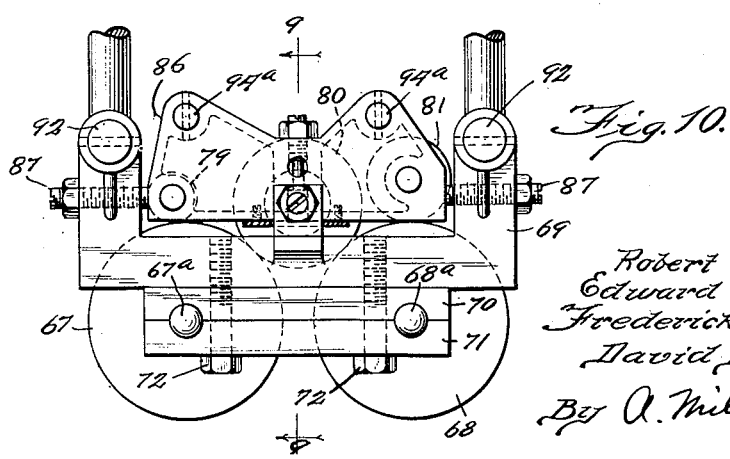

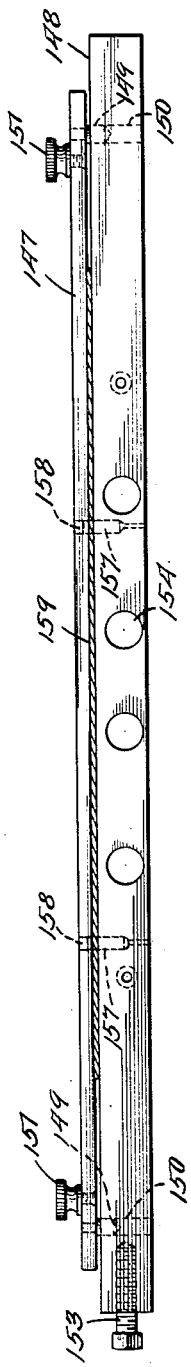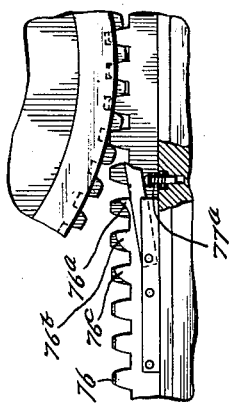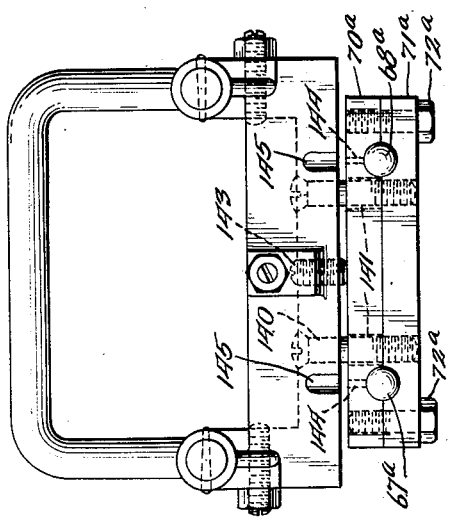

Patented Feb. 21, 1933

1,898,605

UNITED STATES PATENT OFFICE

ROBERT O. VANDERCOOK, EDWARD O. VANDERCOOK, FREDERICK R. VANDERCOOK, AND DAVID D. VANDERCOOK, OF CHICAGO, ILLINOIS

PROOF PRESS AND INKING MECHANISM THEREFOR

Original application filed October 10, 1927, Serial No. 225,287. Divided and this application filed June 21, 1929. Serial No. 372,576.

Our invention relates to proof presses in general, and more particularly to inking mechanisms therefor and this application is a division of our co-pending application, Serial No. 225,287 for proof presses, filed October 10, 1927.

One object of the invention is to arrange for the effective operation and control and inking of the inking rollers of the press.

Another object of the invention is to arrange for the ready lifting of certain of the inking rollers so that they will not crease or otherwise injure other rollers.

Another object of the invention is to arrange for the easy and ready lifting of all of the inking rollers.

Another object of the invention is to arrange for the driving or rotation of the inking rollers either by power driven means or by the operation of the press.

Another object of the invention is to arrange for the ready bodily removal of the inking rollers, or certain of them, to permit them to be washed, or the ink changed, or for other purposes.

In the accompanying drawings:

Fig. 7 is a side elevation of certain inking rollers removed from the machine;

Fig. 8 is a side elevation of other inking rollers removed from the machine;

Fig. 9 is sectional view showing the rollers and frame therefor illustrated in Fig. 7, said Fig. 9 being taken on line 9—9 in Fig. 10;

Fig. 10 is an end view of the mechanism shown in Fig. 9;

Fig. 11 is a view of a detail of construction;

Fig. 12 is a modification of the arrangement shown in Fig. 10; and

Fig. 13 is a detail of construction.

Figure 1:
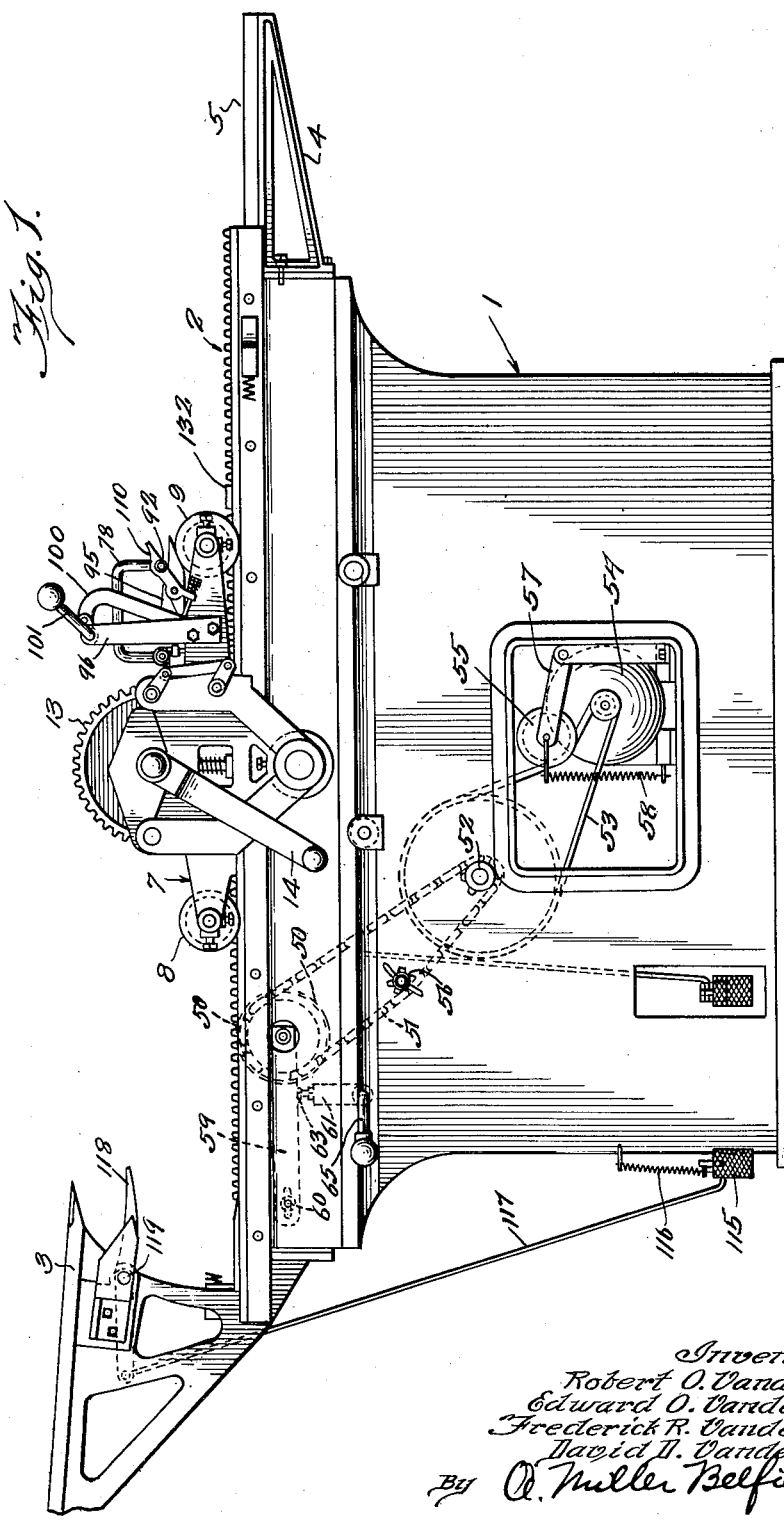
Fig. 1 is a side elevation of a proof press embodying our invention.

Referring to the drawings, we show a machine having a main body portion 1 and a bed 2. At one end, the left-hand end in Fig. 1, there is shown a paper support 3 on which is to be mounted the paper to be fed to the press for the taking of proofs. At the other end, the righthand end in Fig. 1, there is shown a bracket 4 having a holder or plate 5 on which is to be delivered the sheets on which the proof has been printed.

A printing element or roll 6 is shown mounted above the bed 2 and arranged for travel along the same. This roller or cylinder 6 is mounted on a traveling frame 7, which is provided with wheels 8, 8 and 9, 9 running on tracks 10, 10 at opposite sides of the bed 2, so that the traveling carriage 7 may be moved back and forth along the bed 2 and over the form which is understood to be properly placed in position on said bed, said form being shown in the drawings (Fig. 2) at 11. A rack 12 is provided at one side of the machine and a gear 13 is provided on the rotary cylinder 6 and the latter is provided with a handle 14 by which the cylinder 6 may be turned and be caused to move in one direction or the other over the bed 2, as desired.

The cylinder 6 is preferably arranged so that it may be lifted from the form, if desired, on the forward or printing stroke or movement, that is, on the stroke or movement to the right, referring to Fig. 1, during which stroke or movement the proof will be printed when the machine is operated so as to print. By thus arranging so that the cylinder may be lifted during the forward or printing stroke, at such time, of course, the proof will not be printed, because the paper will be elevated above the form on the bed. This operation is desirable, however, in order that the form may be inked preparatory to printing by the inking rollers, it being seen that by moving the carriage carrying the cylinder 6 and the inking rollers, which will be described hereinafter, in a forward direction with the cylinder elevated, the form may be inked as much as desired by the inking rollers. The arrangement also preferably provides for the automatic lifting of the printing cylinder 6 upon each return stroke, so that when the apparatus is arranged for printing and the cylinder is down so that the paper carried by it will print by traveling over the form, the cylinder will be automatically lifted on the return stroke so that there will be no interference or spoiling of the printing done by the forward stroke.

The mechanism, permitting lifting of cylinder 6 from the form, if desired on the forward stroke and for automatically lifting said cylinder on the return stroke to prevent interference or spoiling of the printing, together with other mechanisms associated therewith, is more particularly described in connection with our aforesaid co-pending parent application.

The mechanism for inking and controlling the inking rollers will now be described.

Figure 4:
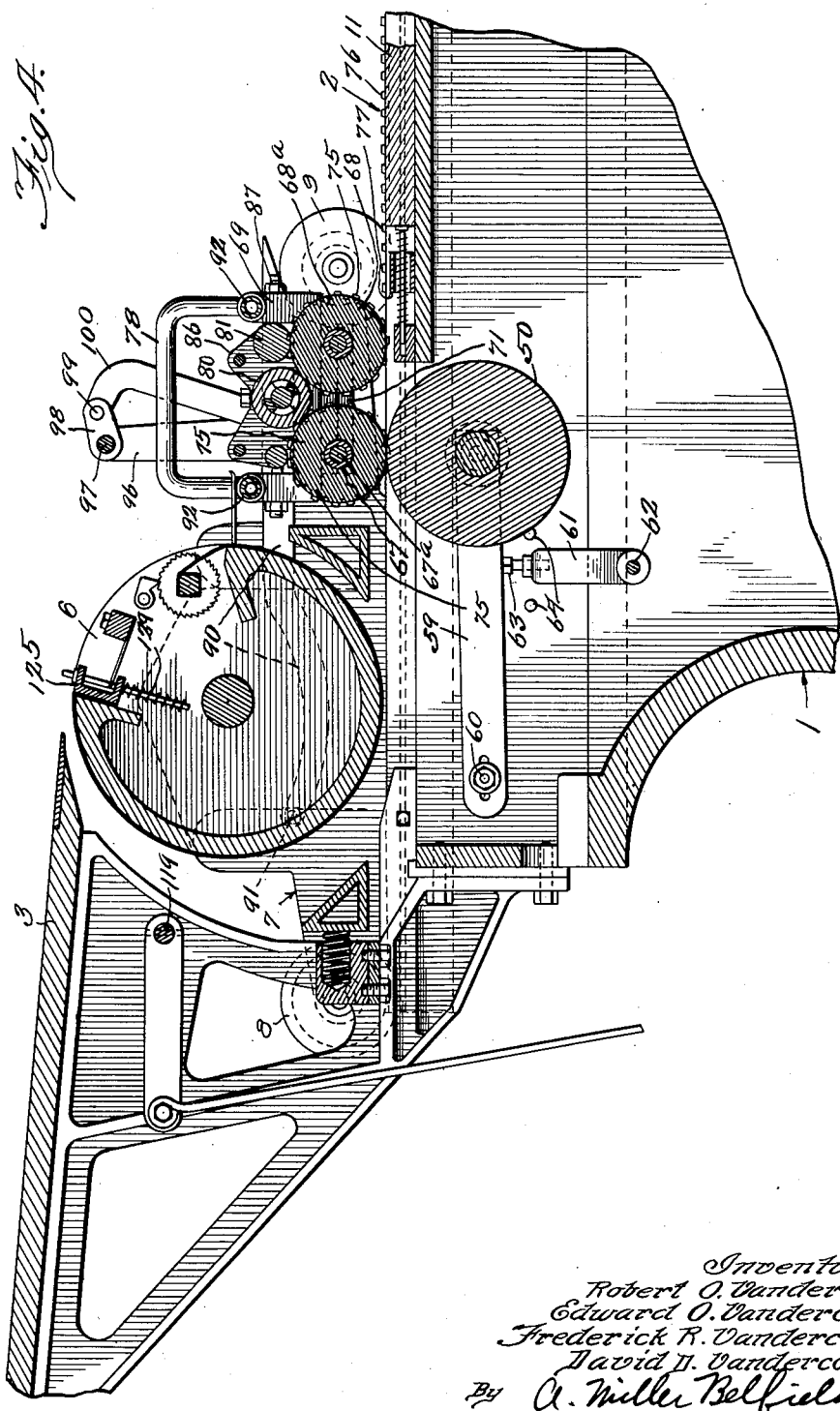
Fig. 4 is a vertical section taken on line 4—4 in Fig. 2.
Figure 6:
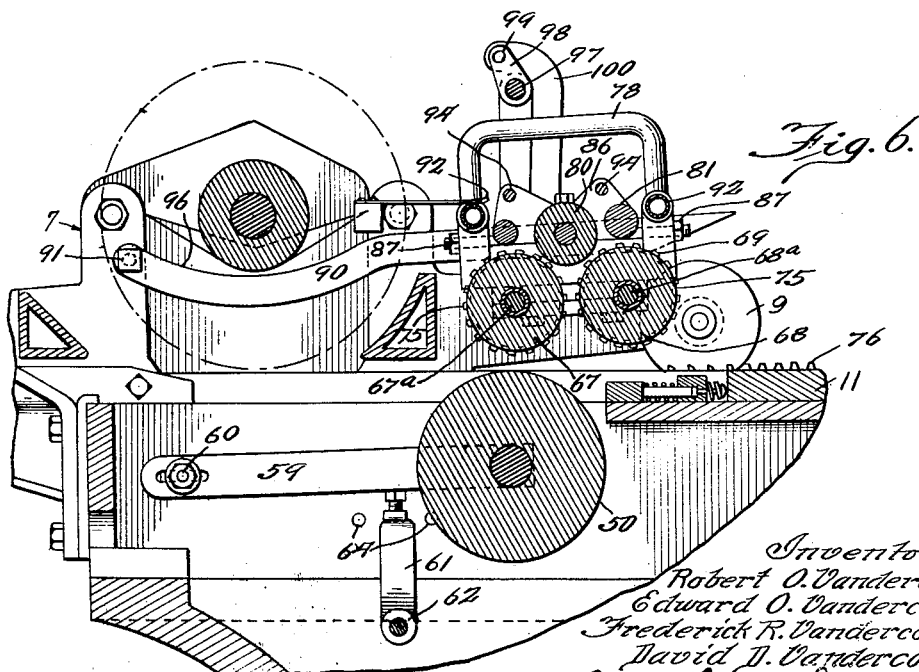
Fig. 6 is a cross section taken on line 6—6 in Fig. 2.

Reference will now be made to the inking mechanism. Referring first to Figs. 1, 4 and 6, we show an inking roll 50, arranged in connection with the frame or bed of the machine so as to cooperate with inking rollers on the traveling carriage 7 carrying the printing roll, as previously referred to. This inking roll 50 is preferably driven continuously and to such end may be connected by a sprocket chain 51 with a drive shaft 52, which is driven by a belt 53 running to a prime mover, such as an electric motor 54, which is shown mounted on the bed 1 of the machine. An idler 55 is arranged to take up slack of the belt 53 and an idler 56 is arranged to take up slack in the sprocket chain 51. The idler 55 may be mounted on a pivotally supported arm 57 controlled by a spring 58.

For the purpose of permitting adjustment the inking roll 50 may be mounted on a swinging arm 59 pivoted at 60 and held normally in position by a second swinging arm 61. The latter is pivotally mounted on a shaft 62 and is preferably provided with an adjusting screw 63 adapted to make contact with and cooperate with swinging arm 59. Stops, 64, 64 are arranged on opposite sides of the arm 61. A hand lever 65 is preferably mounted on the end of shaft 62 so that shaft 62 may be turned by a hand lever 65. Thus, by turning shaft 62 in one way or the other the arm 61 is caused to swing to one side or the other so as to make contact with one of the stops 64 and in this position the inking roller 50 will be lowered slightly so as to be out of contact with other inking rollers to be presently described. When handle 65 is adjusted so as to cause arm 61 to stand upright, as shown in Fig. 4, the adjusting screw 63 will hold arm 59 in an elevated position so as to raise inking roller 50 to make contact with the other rollers referred to. Adjusting screw 63 may be adjusted so as to secure the desired accurate contact between roll 50 and the other rolls mentioned. By this arrangement the roll 50 may be rotated continuously and may also be adjusted to a moderate extent vertically so as to be in position to cooperate or not to cooperate with other inking rolls.

The other inking rolls referred to are the rolls 67, 68, Figs. 3, 4, 6 and 10. These rolls are carried by a roll frame 69, which is preferably mounted on and carried by the traveling carriage 7, but which is preferably made adjustable relatively to said carriage and also preferably made bodily removable therefrom. The roll frame or holder 69 may carry the rolls 67 and 68 by having underneath bearings for the same, which may be formed by plates 70 and 71 arranged on the underside of holder 69 and secured in position by bolts 72, the shafts or spindles 67$^a$ and 68$^a$ being between these plates or members 70 and 71.

Figure 3:
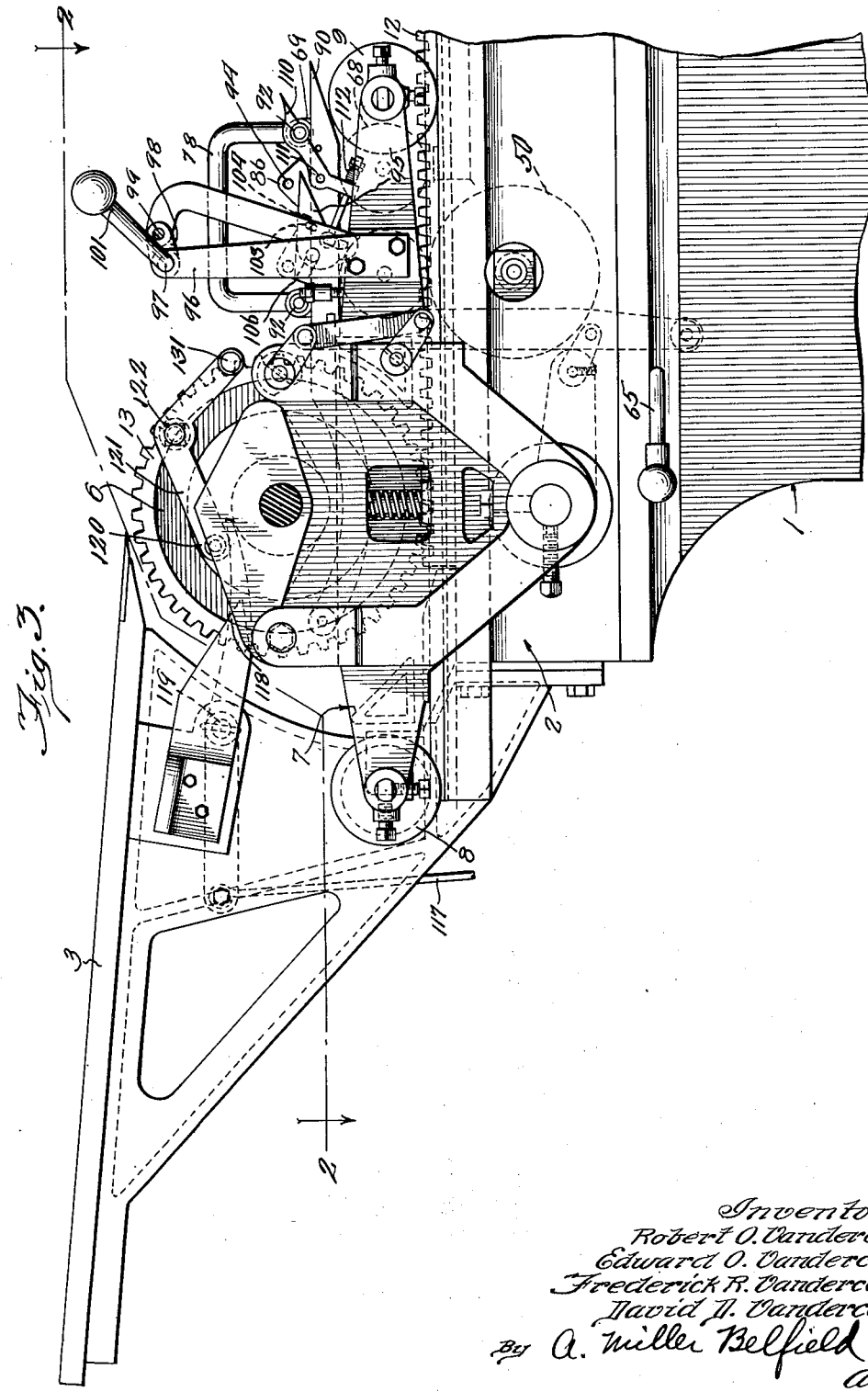
Fig. 3 is a side elevation of an end portion of the device.

When the traveling carriage 7 is at its inner endmost position, as shown in Figs. 3 and 4, the roll 50 will be in contact with the rolls 67 and 68 when said roll 50 is adjusted to its upper or inking position, as shown in Fig. 4. In this condition the roll 50 will continuously turn the roll 67, which, through another roll to be described, will turn the roll 68 and thus the two rolls 67 and 68 will be continuously turned and the ink spread on them as long as may be desired while the printing cylinder is in its innermost position.

The rolls 67 and 68 are preferably provided with gear teeth or pinions 75, 75 which mesh with a rack 76 on the machine frame 2. In this way the rolls 67 and 68 will be turned by the movement of the carriage 7 over the bed of the machine, this turning being due to the pinions 75 traveling over rack 76, the roll 67 at such time being separated from roll 50 and hence not receiving any turning action from the same.

Figure 2:
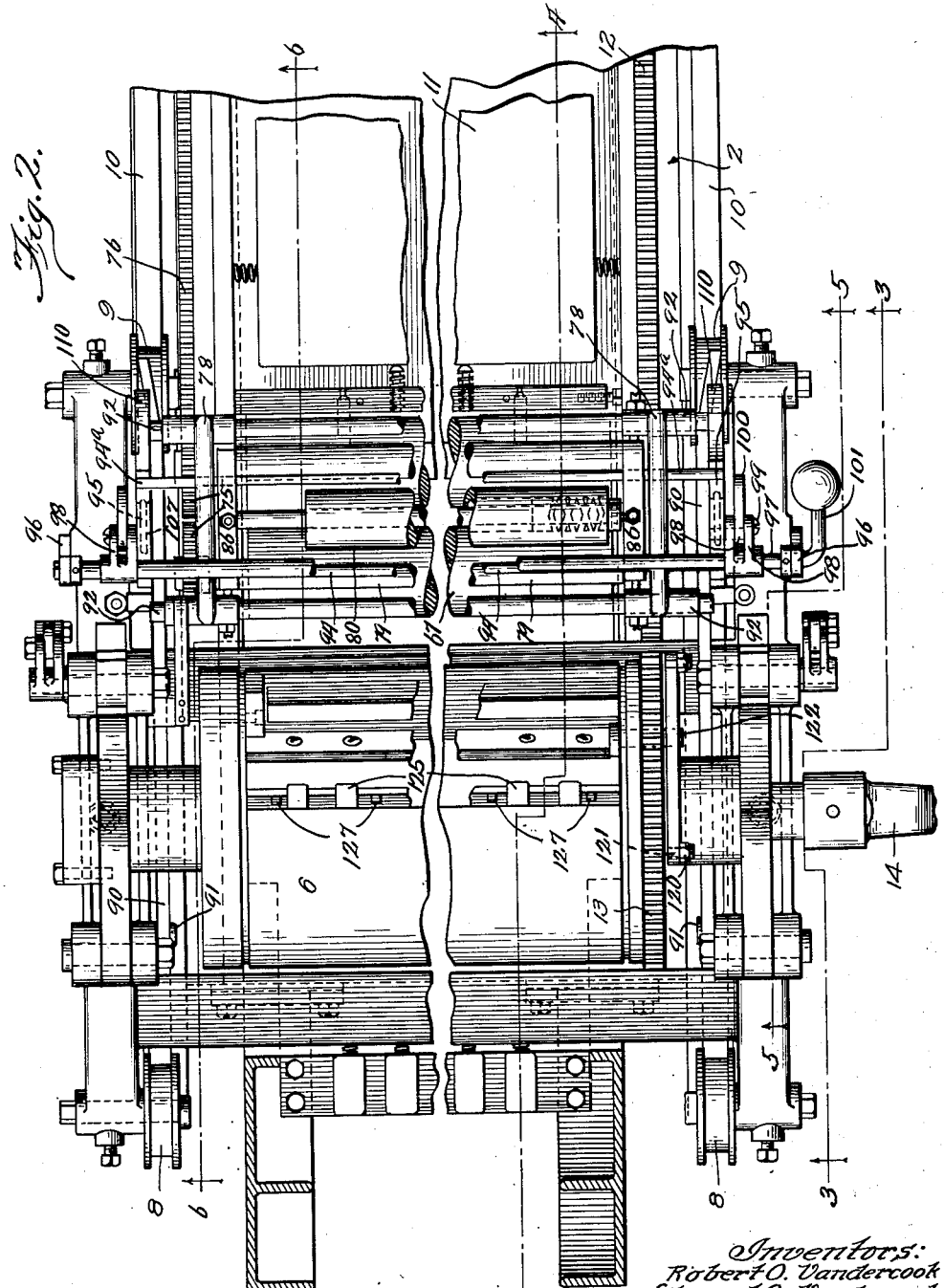
Fig. 2 is a plan view of the central portion of the same on an enlarged scale, Fig. 2 being taken on line 2—2 in Fig. 3.

To insure inking roll teeth 75 meshing properly with rack 76 when inking carriage begins to travel over rack 76 and inking rolls 67 and 68 are to be turned by rack 76 instead of by roll 50, a starting tooth arrangement is provided at end of rack 76 (Figs. 2, 4 and 11). This consists of several teeth 76$^a$, 76$^b$ and 76$^c$, more or less cut away, the end ones being most cut, so that if gear teeth 75 do not register so as to mesh properly with teeth 76, the cut away portions of these starting teeth will accommodate the out of register teeth 75 and adjust them into place. A pivoted arm or lever 77 controlled by spring 77ª is arranged to engage the inking roll teeth 75 and assist in bringing them into proper mesh with rack teeth 76.

The roll frame or holder 69 is preferably provided with handles 78 by which it may be bodily lifted and even removed from the carriage 7, as will be more fully pointed out hereinafter.

Other inking rolls 79, 80 and 81 are also preferably provided, the roll 79 being arranged for cooperation with roll 67 and roll 80 arranged between and for cooperation with rolls 67 and 68, the roll 81 being preferably arranged for cooperation with roll 68. Rolls 79 and 81 are preferably relatively small rolls to which the ink may be applied in the first instance. Roll 80 is a vibratory roll having a certain amount of longitudinal movement in order to better spread and distribute the ink. This longitudinal movement on the part of roll 80 may be secured by the construction shown in Fig. 9, in which a pin 83 on an adjusting screw 84 may fit in an irregular annular slot 85 in roll 80 so that the rotation of said roll will cause its back and forth longitudinal movement.

The rolls 79, 80 and 81 are preferably mounted in a separate or supplemental roll holder or frame 86. This is preferably carried by the first mentioned roll frame 69 and is preferably made adjustable relatively thereto and also bodily removable therefrom.

As a highly desirable arrangement, and as a matter of further and specific improvement, the roll holder or frame 86 is provided with end portions which fit in appropriate spaces in the frame 69, as shown in Fig. 10, adjusting screws 87 being preferably provided to limit the longitudinal movement of the members, or even substantially prevent such movement. The set screws 87, however, are not actually tightened against the end members, but are adjusted so as to permit said members to be lifted relatively to holder 69 and even lifted entirely out of the same, if desired. Thus, by arranging the holder 86 in position in holder 69, the rolls 79, 80 and 81 will make contact and cooperate with rolls 67 and 68 and will act in spreading and distributing the ink on the latter, whether the latter be turned by the continuously rotating roll 50, or turned by movement of the carriage back and forth on the bed. When the holder 86 is lifted relatively to holder 69, the rolls 79, 80 and 81 will be separated from rolls 67 and 68.

As a preferred arrangement, provision is made for the lifting of roll holder 69 relatively to traveling carriage 7 and also for lifting supplemental roll holder 86 relatively to roll holder 69 and this is preferably done by mechanism which will accomplish both results. In the arrangement shown, which constitutes one of a variety of mechanisms for accomplishing this result, the carriage 7 is provided with a pair of longitudinally extending swinging arms or members 90, Figs. 4, 5 and 6, these members being pivoted at 91 and extending lengthwise to and through the holder 69. The latter is provided with transverse bars or rods 92, which are normally in position above the arms 90 so that by swinging the arms 90 upwardly they will be brought into contact with the cross bars or rods 92. The supplemental holder 85 is provided with cross bars or rods 94 and toggle lifting members 95 are arranged below the ends of the members 94 but close to the same so that by lifting the toggle members 95 contact will be made with the cross members 94 so that the same may be lifted.

Figure 5:
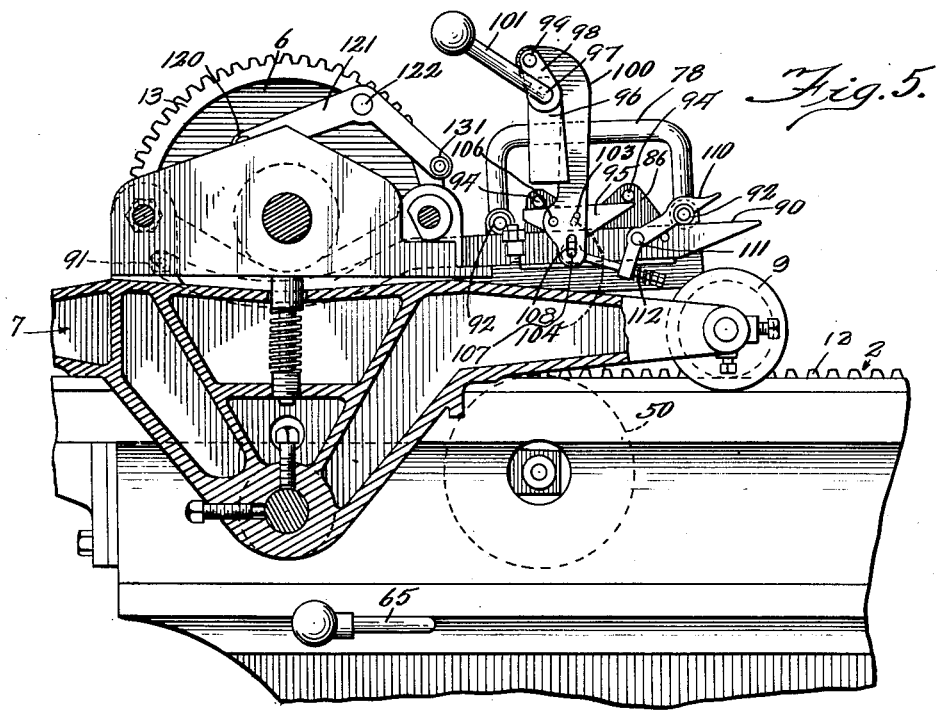
Fig. 5 is a cross section taken on line 5—5 in Fig. 2.

The carriage 7 is provided with upwardly extending standards 96, at the upper end of which a cross shaft 97 is mounted. This shaft 97 carries crank arms 98 to which is pivoted at 99 links 100, the cross shaft 97 being provided with a handle 101 by which the shaft may be turned. The links 100 have lifting connections with the toggle members 95, as, for example, by providing the links 100 with pins 103 adapted to work in slots 104 in the members 95 which latter are pivoted at 106 to the uprights or standards 96. The links 100 also preferably have lifting connections with arms 90, as, for example, by providing arms 90 with pins 107 and providing links 100 with slots 108 for said pins 107. By this arrangement links 100 may be vertically adjusted by the turning of shaft 97 by handle 101 so as to raise and lower both the roll holders 69 and 85. The operation is that when the handle 101 is in a righthand or down position, as indicated in Fig. 3, the links 100 will be down and both holders 69 and 85 will be down so that the rolls carried thereby will be in contact with other rolls. When, however, the handle 101 is swung to the left, or upwardly as it may be called as shown in Figs. 5 and 6, the links 100 will be elevated and pins 103 carried thereby will be moved in slots 104 until they reach the upper ends of said slots at which time the members 95 will be moved upwardly to engage the cross-bars 94, and then a further upward movement of links 100 will lift holder 86, as shown in said Figs. 5 and 6. The same upward movement of links 100 will cause pins 107 to be engaged by the bottom of slots 108 so that the links 100 become effective in raising arms 90 and thereby causing said arms to act against cross-bars 92 and lift the same and thereby lift the main roll holder 69. This elevated position is shown in Figs. 5 and 6. In such position, as best shown in Fig. 6, the rolls 67 and 68 will be lifted so that the roll 67 will be out of contact with roll 50. Also, the holder 86 will be so lifted that the rolls 79, 80 and 81, will be out of contact with rolls 67 and 68. In this way the rolls will be all separated from each other so that they will not gum nor stick to one another, nor cause grooves or depressions to be formed in any of the rolls. Furthermore, if desired, the holder 86 may be lifted entirely out of holder 69 and away from the machine by taking hold of the projecting ends 94$^a$ of cross-bars 94 (Figs. 3 and 8) and lifting holder 86 by these projecting ends. In this way rolls 79, 80 and 81 may be washed and cleaned, if desired. Furthermore, the main roll holder 69 may be lifted bodily from the machine, if desired, by taking hold of the handles 78 and lifting the roll holder out of the machine. This may be done either with the holder 86 in place, or out of place, in holder 69. In this case the locking clips 110 pivoted at 111 to arms 90 and controlled by springs 112, may be lifted or swung upwardly so as to become disengaged from cross-bars 92 and thereby permit holder 69 to be moved or slid out of the machine to the right, referring to Figs. 3, 5 and 6. When holder 69 is replaced in the machine, clips 110 will be swung upwardly to permit ends of cross-bars 92 to slip underneath said clips and be then engaged by the same, as shown in Figs. 3 and 5. The removal of the holder 69 will permit rolls 67 and 68 to be washed and cleaned. If desired, the upper or supplemental holder 86 may be lifted by links 100 without lifting the lower or main holder 69 by swinging handle 101 to a substantially vertical position, in which case links 100 will cause members 94 to engage and elevate holder 86 before pins 107 are engaged by the lower end of slots 108. Thus it will be seen that the various inking rolls may be manipulated and adjusted in order to secure desirable results in the operation of the machine. Removal of holder 69 with all inking rolls permits another complete inking unit to be substituted in its place. Thus different color inks may be readily used, without the need of washing ink rolls, one inking unit having one color ink and another another color, and these being interchangeable in the machine.

As an arrangement for engaging the paper with the printing cylinder, I show a foot lever 115, Fig. 1, controlled by a spring 116 and connected with a rod 117, which in turn is connected with a lever arm 118 pivoted at 119. Arm 118 is adapted to cooperate with roller 120, Fig. 3, on bell crank 121 pivoted at 122 on printing cylinder 6. Bell crank 121 controls a spring controlled paper clip 125, Fig. 4, on the cylinder 6, so that when bell crank 121 is swung upwardly by lever 118 spring clip 125 will be elevated so as to permit a sheet of paper to be interposed between clip 125 and the cylinder surface. Clip 125 carries an abutment 127 to stop the forward movement of the paper. Thus, when the cylinder 6 is in position to receive a sheet of paper, as shown in Figs. 3 and 4, the foot treadle 115 is depressed, thereby lifting clip 125 and permitting insertion of paper, after which treadle 115 is released permitting it be moved upwardly by spring 116, whereupon clip 125 is depressed by spring 129, thereby causing said clip to engage the sheet of paper and hold it to the cylinder. The cylinder is then turned by the crank arm 14 so as to move the cylinder and its carriage along the bed of the machine. At the opposite end, that is the righthand end in Fig. 1, the roller 131, Fig. 5, on bell crank 121 will strike an abutment 132, Fig. 1, and cause said bell crank 121 to be swung and the paper clip 125 separated so as to release the paper.

In Fig. 12 we show a modified form of the removable and interchangeable inking roll unit, one form of which is shown in Fig. 10, and previously described. In the modification of Fig. 12 the bearing for the ink roll shafts 67$^a$ and 68$^a$ is formed by members or plates 70$^a$ and 71$^a$ similar to the plates or members 70 and 71, respectively in Fig. 10. In this latter figure, however, arrangement is made to mount or support this bearing composed of members 70$^a$ and 71$^a$ more independently of the inking roll unit than in the arrangement of Fig. 10. To such end the members 70$^a$ and 71$^a$ are held together by screws 72$^a$, which extend simply through the members 70$^a$ and 71$^a$ and do not extend into the main body portion of the unit or holder 69, as in the case of Fig. 10. In this way the bearing for the rollers 67 and 68 may be spaced from the body member 69 and adjusted relatively thereto for various purposes.

For such spacing and adjustment various means can be used, but a simple arrangement is to provide two (2) screws, 140, 140, which pass through the bottom portion of member 69 and engage one of the members 70$^a$ and 81$^a$, as, for example, the lower member 71$^a$, passing through apertures 141 in members 70$^a$, which permit the screws to move freely with reference to said member 70$^a$. Also another screw 143 is provided and this likewise passes through the lower portion of member 69 and is adapted to contact with and engage the top surface of member 70$^a$. All of these screws 140, 140 and 143 may be turned relatively to member 69, and to such end are provided with slotted heads, as shown, whereby spacing and adjustment of the bearing may be arranged, as desired.

Oil openings 144 are preferably provided in member 70$^a$ for oiling journals 67$^a$ and 68$^a$, and slots or grooves 145 are also preferably provided in member 69 for permitting access to apertures 144 by an oil can, or otherwise.

Referring to Fig. 13, we show an arrangement for providing the press with a frisket frame arrangement. This comprises a pair of bars 147 and 148, whereof the upper bar 147 is provided with pins 149 adapted to fit into apertures 150 in lower bar 148. Upper bar 147 is also provided with knurled thumb screws 151, by which it may be readily raised and lowered relatively to lower bar 148 and fitted in position upon the same.

Also bar 148 is provided with a threaded bolt 153 adapted to be screwed outwardly from the end of bar 148 a greater or less distance. By this arrangement bar 148 may be fitted to the bed or frame of the press, as shown in Fig. 2, and bolt 153 may be adjusted so as to hold bar 148 firmly in position. Bar 148 is also provided with apertures 154 into which fit springs 155 for holding chase 156 in position. Bar 148 is also provided with pins 157 adapted to fit into apertures 158 in upper bar 147. A sheet or film 159 of transparent material, such as celluloid, or more or less transparent paper, or the like, is shown between bars 147 and 148.

In this way arrangement may be made for accurately placing printing elements in the chase or other holding device in order to use different colored inks. The arrangement is something of a frisket frame arrangement and permits a sheet of transparent material 159 to be fitted between the members 147 and 148 and held in position by pressing member 147 down so that pins 157 punch apertures in sheet 159 and so hold the same in position. At this time a proof is taken of the printing element in position in the press. The sheet 159 is then removed by removing upper member 147 and the press is used in connection with such printing element. When another printing element is to be used it is placed in the press and adjusted generally in position and then the film 159 with the proof on it is placed in position with the previously made apertures in register with pins 157 and then the printing element is accurately adjusted by means of the proof or impression on film 159 so that said printing element is in exactly the proper position for its printing to register with that previously done. Member 147 and film 159 is then removed and printing done by the second printing element. This may be done as often as desired.

It will be understood that changes and modifications may be made without departing from the spirit of the invention.

What we claim is:

1. A machine of the class specified having a traveling carriage provided with a printing element and also provided with inking rolls and inking devices, means for continuously driving said rolls when the carriage is in position at one of the ends of its strokes and means for moving the inking devices in contact with the inking rolls.

2. A machine of the class specified having a traveling carriage provided with a printing element and also provided with inking rolls, and means for continuously driving said rolls for applying ink thereto when the carriage is at rest and is in position to receive the paper.

3. A machine of the class specified having a traveling carriage provided with a printing element and inking rolls, and means for bodily removing the inking rolls as a unit from the traveling carriage.

4. A machine of the class specified having a traveling carriage provided with a printing element and also provided with inking rolls, one of which is adjustable in combination with an inking roll 50 on the machine frame to cooperate with said inking roll on the carriage, said inking roll 50 being adapted to be adjusted into and out of contact with said inking roll on the carriage.

5. A machine of the class specified having a traveling carriage provided with two sets of inking rolls, an inking roller 50 on the machine frame in combination with means for adjusting said inking roller 50 with one set of said inking rolls on the carriage, and means for raising one set of rolls on the carriage into and out of contact with the other set.

6. In a machine of the class specified, a traveling carriage provided with inking roll holders carrying inking rolls, both of said holders having lever means for raising them relatively to the carriage for lifting them out of contact with the printing form.

7. In a machine of the class specified, a traveling carriage provided with inking roll holders carrying inking rolls, one of said holders having lever means for raising them relatively to the carriage, and the other holder having lever and link means for raising it relatively to the first mentioned holder.

8. In a machine of the class specified, a traveling carriage provided with inking roll holders carrying inking rolls, an openable spring latch to release said holders so that both holders may be rendered bodily removable from the carriage.

9. In a machine of the class specified, a traveling carriage provided with inking roll holders carrying inking rolls, an openable spring latch to release said holders so that both may be rendered bodily removable from the carriage, and one of said holders being carried by the other holder.

10. In a machine of the class specified, a traveling carriage provided with inking roll holders carrying inking rolls, an openable spring latch to release said holders so that both holders may be rendered bodily removable from the carriage and one of said holders being carried by the other holder and bodily removable therefrom.

11. In a machine of the class specified, a traveling carriage provided with holders carrying inking rolls, said holders having lever means for raising them relatively to the carriage, and link and lever means for raising either or both of said holders relatively to the carriage.

12. In a machine of the class specified, a traveling carriage provided with inking roll holders, levers associated therewith for raising them relatively to the carriage, and link and lever means for raising one holder relatively to the other.

13. In a machine of the class specified, a traveling carriage provided with inking roll holders, levers associated therewith for raising them relatively to the carriage, and link and lever means for raising one holder relatively to the other and for raising said other holder relatively to the carriage.

14. In a machine of the class specified, a traveling carriage provided with inking roll holders one of which carries inking rolls adapted to cooperate with a continuously driven inking roll 50 on the machine frame and adapted to be turned by the movement of the carriage to bring same in engagement with said continuously driven roll, and the other of which holders carries rolls adapted to cooperate with the rolls on the first mentioned holder.

15. In a machine of the class specified, a traveling carriage provided with inking roll holders, one of which carries inking rolls adapted to cooperate with a continuously driven inking roll 50 adjustably mounted on the machine frame and adapted to be turned by the movement of the carriage to bring same in engagement with said continuously driven roll and the other of which holders carries rolls adapted to cooperate with the rolls on the first mentioned holder, the first mentioned holder having means for raising it and its rollers relatively to the carriage, and the second mentioned holder being mounted for adjustment relatively to the first holder.

16. In a machine of the class specified, a traveling carriage provided with inking roll holders, one of which carries inking rolls adapted to cooperate with a continuously driven inking roll 50 adjustably mounted on the machine frame and adapted to be turned by the movement of the carriage to bring same in engagement with said continuously driven roll and the other of which holders carries rolls adapted to cooperate with the rolls on the first mentioned holder, the first mentioned holder having means for raising it and its rollers relatively to the carriage, and the second mentioned holder being mounted for adjustment relatively to the first holder and being carried by the same.

17. In a machine of the class specified, the combination of a traveling carriage provided with a plurality of inking roll holders, each carrying inking rolls, said holders having vertical movement relatively to the carriage, and link and lever means for raising said holders.

18. In a machine of the class specified, the combination of a traveling carriage, means for moving same across the form and provided with a plurality of inking roll holders, each carrying inking rolls, said holders being adjustable relatively to the carriage, and means for adjusting said holders, said last mentioned means comprising a single mechanism adapted to actuate and adjust both holders.

19. In a machine of the class specified, the combination of a traveling carriage, means for moving same across the form and provided with main and supplemental inking roll holders carrying inking rolls, the main holder carrying rolls adapted to apply ink to the printing form on the machine bed, and the other holder carrying rolls adapted to ditribute ink to the rolls on the main holder, said holders having link and lever means for raising them in the carriage, away from the form bed.

20. In a machine of the class specified, the combination of a traveling carriage, means for moving same across the form and provided with main and supplemental inking roll holders carrying inking rolls, the main holder carrying rolls adapted to apply ink to the printing form on the machine bed, and the other holder carrying rolls adapted to distribute ink to the rolls on the main holder, said holders having link and lever means for raising them in the carriage, away from the form bed.

21. In a machine of the class specified, the combination of a traveling carriage, means for moving same across the form and provided with main and supplemental inking roll holders carrying inking rolls, the main holder carrying rolls adapted to apply ink to the printing form on the machine bed, and the other holder carrying rolls adapted to distribute ink to the rolls on the main holder, said holders having link and lever means for raising them in the carriage, away from the form bed and a releasable spring latch for bodily removing the holders from the carriage.

22. In a machine of the class specified, a traveling carriage provided with a holder carrying inking rolls for applying ink to the printing form and also for cooperating with an inking roller 50 on the machine frame, said holder having lever and link means for raising it relatively to the carriage.

23. In a machine of the class specified, a traveling carriage provided with a holder carrying inking rolls for applying ink to the printing form and also for cooperating with an inking roller 50 on the machine frame, said holder having lever and link means for raising it relatively to the carriage and an openable spring latch to release the said roller and frame from the said carriage.

24. In a machine of the class specified, a traveling carriage provided with a holder carrying inking rolls for applying ink to the printing form and also for cooperating with an adjustable inking roller 50 on the machine frame, said holder being mounted for vertical movement relatively to the carriage, and a second holder carrying inking rolls adapted to apply ink to the inking rolls on the first mentioned holder.

25. In a machine of the class specified, a traveling carriage provided with a holder carrying inking rolls for applying ink to the printing form and also for cooperating with an adjustable inking roller 50 on the machine frame, said holder being mounted for vertical movement relatively to the carriage, and a second holder carrying inking rolls adapted to apply ink to the inking rolls on the first mentioned holder, said second holder being mounted for vertical movement relatively to the first holder.

26. In a machine of the class specified, a traveling carriage provided with a holder carrying inking rolls for applying ink to the printing form and also for cooperating with an adjustable inking roller 50 on the machine frame, said holder being mounted for vertical movement relatively to the carriage, and a second holder carrying inking rolls adapted to apply ink to the inking rolls on the first mentioned holder, said second holder being mounted for vertical movement relatively to the first holder and being carried thereby.

27. In a machine of the class specified, a traveling carriage provided with a holder carrying inking rolls for applying ink to the printing form and also for cooperating with an inking roller on the machine frame, said holder being mounted for adjustment relatively to the carriage, and a second holder carrying inking rolls adapted to apply ink to the inking rolls on the first mentioned holder, said second holder being mounted for adjustment relatively to the first holder, in combination with means for adjusting said holders comprising an adjustable member having loose connections with said holders adapted to adjust the same when said member is adjusted.

28. In a machine of the class specified, a traveling carriage provided with a holder carrying inking rolls for applying ink to the printing form and also for cooperating with an inking roller on the machine frame, said holder being mounted for adjustment relatively to the carriage, a second holder carrying inking rolls adapted to apply ink to the inking rolls on the first mentioned holder, said second holder being mounted for adjustment relatively to the first holder in combination with means for adjusting said holders comprising an adjustable member having loose connections with said holders adapted to adjust the same when said member is adjusted, and manually operable means for adjusting said member.

29. The combination with the holders 69 and 86 of lifting mechanism comprising vertically adjustable links 100, toggle members 95 having pin and slot connections with the links 100, pivoted arms 90 having pin and slot connections with links 100, and projections on the holder 86 adapted to engage the toggle members 95 and projections on the holder 69 adapted to engage the arms 90.

30. In a machine of the class described the combination of the holders 69 and 86, the holder 86 being carried solely by the holder 69 and lever means for raising it from said holder 69.

31. In a machine of the class described the combination of the holders 69 and 86 comprising a detachable unit, the holder 86 being carried by the holder 69 and arranged so as to be easily and bodily removable therefrom without the use of tools.

32. The combination of a traveling carriage with the holder 69 of swinging arms 90, pivotally attached to said carriage and rods on the holder 69 projecting laterally beyond the said holder and over the said arms 90 adapted to be engaged by the said arms 90 to raise said holder free from the said carriage.

33. The combination of a traveling carriage with the holder 69 of swinging arms 90, pivotally attached to said carriage and rods on the holder 69 projecting laterally beyond the said holder and over the said arms 90 adapted to be engaged by the said arms 90 to raise said holder free from the said carriage, and means for vertically raising the said arms 90 to raise and lower said holder.

34. The combination with the holder 69 of swinging arms 90, and projections on the holder 69 adapted to be engaged by said arms 90 to raise said holder, in combination with means for vertically adjusting the arms 90 to raise and lower said holder, said means comprising a rock shaft provided with crank arms, links pivotally connected with said crank arms providing means for separately raising the holders, a pin secured in each of said arms and slots in the links for making lost motion connections between said links and said arms 90.

35. In a machine of the class specified, including a stationary printing form bed, and a traveling carriage, the combination of an inking roll holder having side projections, swinging arms pivoted on the said carriage and extending at the sides of said holder to engage said projections, means for raising said arms whereby the holder may be raised by lifting the said arms and may be removed for cleaning the rollers in said holders by sliding said projections along said arms above the said printing form.

36. In a machine of the class specified, including a stationary printing form bed, and a traveling carriage, the combination of an inking roll holder having side projections, swinging arms pivoted on the said carriage and extending at the sides of said holder to engage said projections, means for raising said arms whereby the holder may be raised by lifting said arms and may be removed by sliding said projections along said arms above the said printing form, and a spring controlled clip for engaging one of said side projections to hold said holder in position.

37. The combination of an inking roll holder having side projections, toggle members to engage said projections, and a vertically adjustable lifting element having pin and slot connections with said toggle members.

38. The combination of an inking roller, a swinging arm carrying the same and a pivoted swinging support controlling said swinging arm to raise and lower said roller, said swinging support being provided with a manually operable handle and having an adjusting screw engaging said swinging arm.

39. The combination with the ink roller carriage provided with toothed inking rolls, of a rack cooperating therewith and provided with teeth having cut-away portions.

40. The combination with the ink roller carriage provided with toothed inking rolls, of a rack cooperating therewith and provided with teeth having cut-away portions, the teeth at the end of the rack being most cut-away and the other teeth being successively less cut-away.

41. The combination with the inking roll carriage provided with toothed inking rolls, of a rack cooperating therewith, and a pivoted spring controlled device at the end of the rack to engage the inking roll teeth.

42. An inking unit comprising a holder for certain inking rolls, and an adjustable bearing for another inking roll 50, said adjustable bearing being provided with adjusting means comprising a tilting lever 61 and an adjustable screw for spacing and adjusting the said roller 50 relatively to said holder.

43. A machine of the class specified having a traveling carriage provided with a printing element and also provided with inking rollers and inking devices, means for continuously driving said rollers when the carriage is at one end of its stroke and means for indefinitely continuing the contact of said inking rollers with the inking device.

44. A machine of the class specified having a traveling carriage provided with a printing element and also provided with adjustable inking rollers, an ink applying roll 50 for supplying ink to the said inking rollers, motor means for continuously driving said ink supplying roll, and means for continuing the contact of the inking rollers with said ink supplying roll.

In witness whereof, we hereunto subscribe our names this 3rd day of June A. D., 1929.

ROBERT O. VANDERCOOK.
EDWARD O. VANDERCOOK.
FREDERICK R. VANDERCOOK.
DAVID D. VANDERCOOK.